US008532233B2

(12) United States Patent
Shimomura

(10) Patent No.: US 8,532,233 B2
(45) Date of Patent: Sep. 10, 2013

(54) APPARATUS AND METHOD FOR FREQUENCY OFFSET ESTIMATION

(75) Inventor: Tsuyoshi Shimomura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 99 days.

(21) Appl. No.: 13/017,667

(22) Filed: Jan. 31, 2011

(65) Prior Publication Data
US 2011/0124359 A1 May 26, 2011

Related U.S. Application Data

(63) Continuation of application No. PCT/JP2008/002272, filed on Aug. 21, 2008.

(51) Int. Cl.
H03D 1/00 (2006.01)

(52) U.S. Cl.
USPC ........... 375/343; 370/320; 370/335; 370/324; 370/479; 455/91; 455/436; 375/150; 375/142; 375/130

(58) Field of Classification Search
USPC ......... 370/208, 342, 343, 480, 503; 375/260, 375/267, 295, 343; 455/67, 182, 192, 277, 455/140
See application file for complete search history.

(56) References Cited

U.S. PATENT DOCUMENTS

| 5,602,881 | A | 2/1997 | Shiino et al. | |
|---|---|---|---|---|
| 6,567,482 | B1* | 5/2003 | Popovic' | 375/343 |
| 6,711,123 | B1 | 3/2004 | Taira | |
| 7,006,587 | B1* | 2/2006 | Lewis et al. | 375/365 |
| 7,149,266 | B1* | 12/2006 | Imamura et al. | 375/355 |
| 8,059,765 | B2* | 11/2011 | Tormalehto | 375/343 |
| 8,134,997 | B2* | 3/2012 | Nakagawa et al. | 370/350 |
| 8,144,746 | B2* | 3/2012 | Iwai et al. | 375/146 |
| 8,144,819 | B2* | 3/2012 | Baldemair et al. | 375/343 |
| 8,462,643 | B2* | 6/2013 | Walton et al. | 370/252 |
| 2004/0229650 | A1 | 11/2004 | Fitton et al. | |
| 2007/0072570 | A1* | 3/2007 | Hottinen et al. | 455/277.2 |
| 2008/0107086 | A1* | 5/2008 | Fukuta et al. | 370/335 |
| 2008/0165903 | A1* | 7/2008 | Hooli et al. | 375/343 |
| 2008/0232516 | A1* | 9/2008 | Cheng et al. | 375/344 |
| 2009/0046691 | A1* | 2/2009 | Karjalainen et al. | 370/342 |
| 2011/0086658 | A1* | 4/2011 | Baldemair | 455/507 |
| 2011/0158104 | A1* | 6/2011 | Frenger et al. | 370/241 |

FOREIGN PATENT DOCUMENTS

| JP | 2000-236314 | 8/2000 |
|---|---|---|
| JP | 2000-341236 | 12/2000 |
| JP | 2001-36500 | 2/2001 |

(Continued)

OTHER PUBLICATIONS

Notice of Rejection and English Translation Thereof for Corresponding JP Application 2010-525505 Mailed Sep. 27, 2011.

Primary Examiner — Daniel Washburn
Assistant Examiner — Amneet Singh
(74) Attorney, Agent, or Firm — Myers Wolin, LLC

(57) ABSTRACT

A user terminal transmits a preamble signal generated using a Zadoff-Chu sequence. A correlation processing unit calculates autocorrelation of a received preamble signal. A preamble detection unit detects a side peak position of the autocorrelation of the preamble signal and calculates the main correlation value representing correlation at the main peak position and the side correlation value representing correlation at the side peak position. A frequency offset estimation unit estimates frequency offset that has occurred in the wireless transmission path according to the main correlation value and the side correlation value.

10 Claims, 22 Drawing Sheets

(56) References Cited

FOREIGN PATENT DOCUMENTS

| | | |
|---|---|---|
| JP | 2003-188846 | 7/2003 |
| JP | 2003-198426 | 7/2003 |
| JP | 2004-48755 | 2/2004 |
| JP | 2004-128657 | 4/2004 |
| JP | 2005-318533 | 11/2005 |
| JP | 2006-014380 | 1/2006 |
| JP | 2006-519552 | 8/2006 |
| JP | 2007-019985 | 1/2007 |
| JP | 2007-135246 | 5/2007 |
| JP | 2007-166171 | 6/2007 |
| JP | 2007-166173 | 6/2007 |
| JP | 2007-300384 | 11/2007 |
| JP | 2011-502365 | 1/2011 |
| WO | 93/22861 | 11/1993 |
| WO | 2008/053971 | 5/2008 |

* cited by examiner

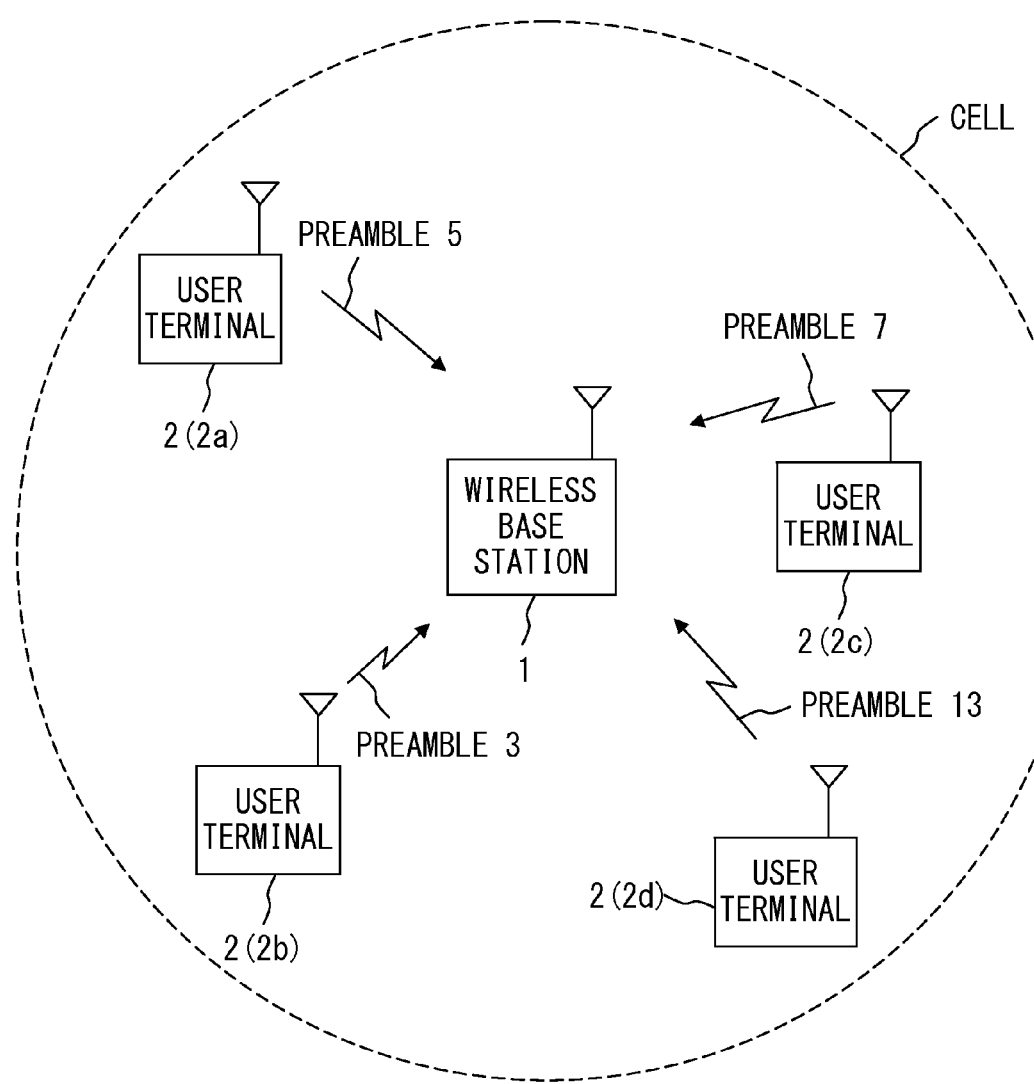
F I G. 3

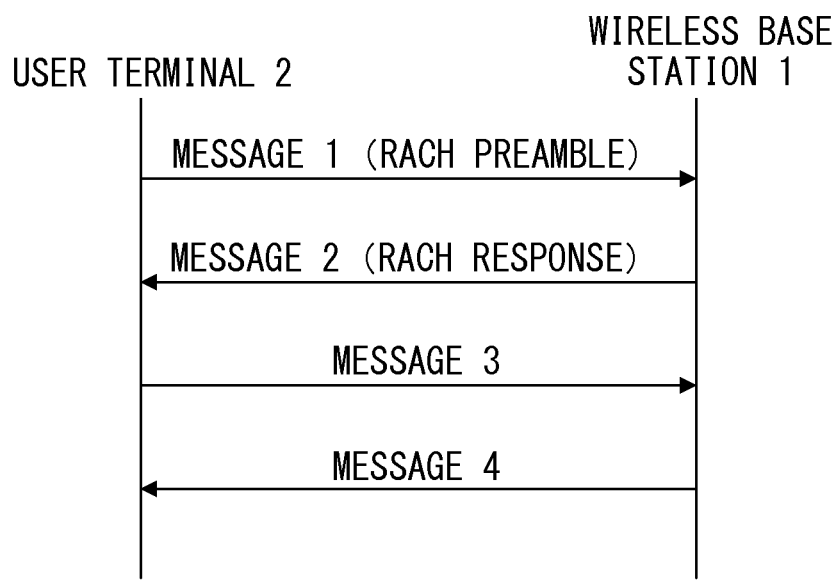
F I G. 4

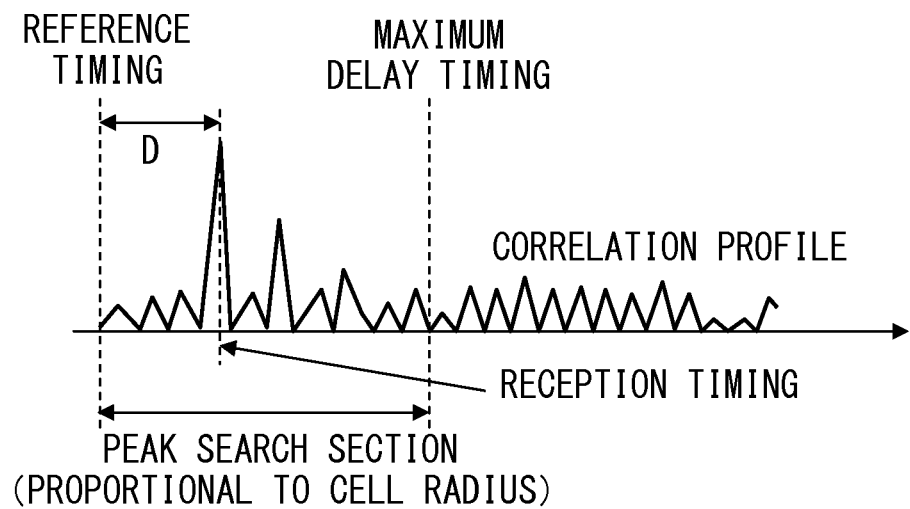
F I G. 5

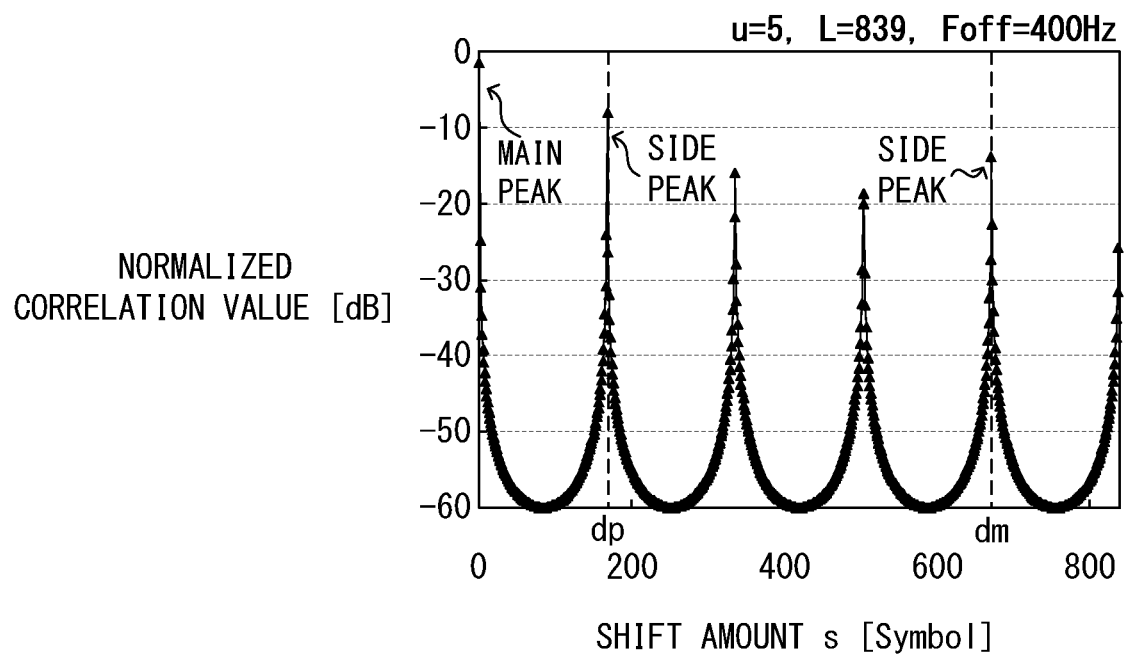
F I G. 7B

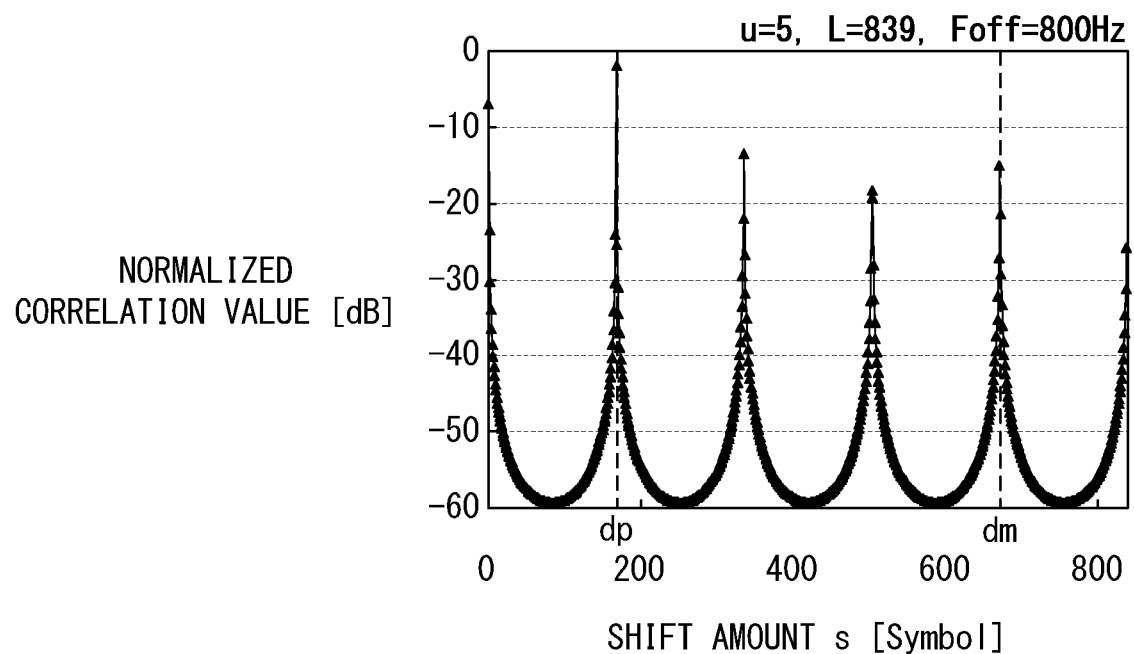
F I G. 7 C

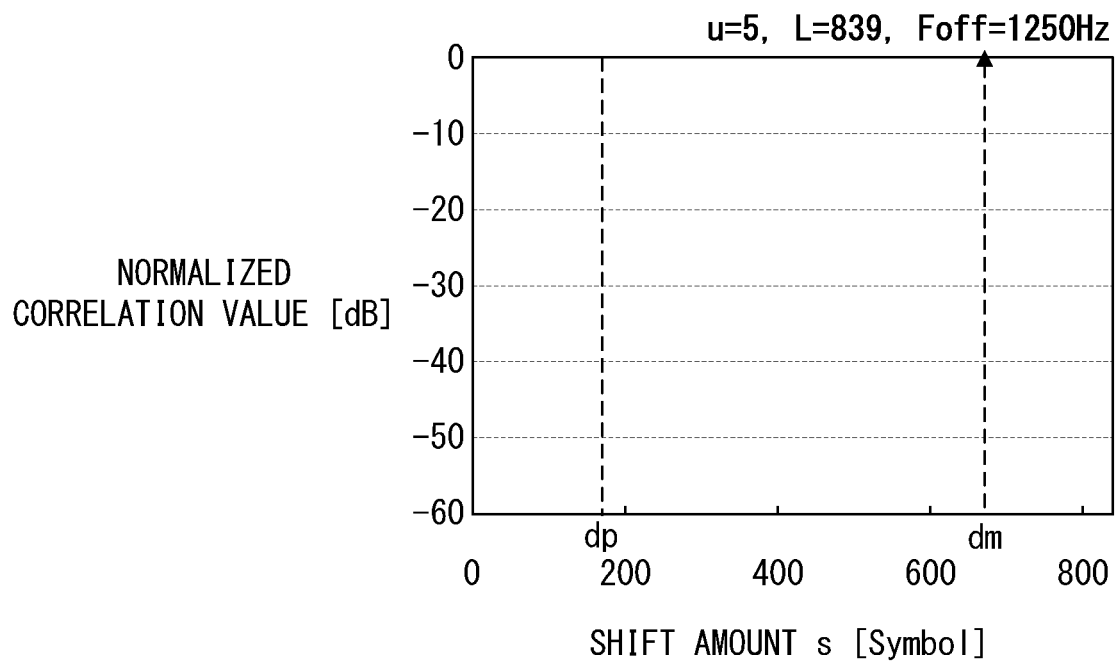
F I G. 7 E (a)

| PREAMBLE NUMBER | Zadoff-Chu SEQUENCE NUMBER |
|---|---|
| 0 | 3 |
| 1 | 836 |
| 2 | 19 |
| 3 | 820 |
| 4 | 22 |
| 5 | 817 |
| 6 | 41 |
| 7 | 798 |
| 8 | 38 |
| 9 | 801 |
| 10 | 44 |
| 11 | 795 |
| 12 | 52 |
| 13 | 787 |
| 14 | 45 |
| 15 | 794 |
| 16 | 63 |
| 17 | 776 |
| 18 | 67 |
| 19 | 772 |
| ⋮ | ⋮ |
| ⋮ | ⋮ |
| 63 | 713 |

(b)

| PREAMBLE NUMBER | dp |
|---|---|
| 0 | 280 |
| 1 | 559 |
| 2 | 265 |
| 3 | 574 |
| 4 | 267 |
| 5 | 572 |
| 6 | 573 |
| 7 | 266 |
| 8 | 552 |
| 9 | 287 |
| 10 | 553 |
| 11 | 286 |
| 12 | 597 |
| 13 | 242 |
| 14 | 578 |
| 15 | 261 |
| 16 | 293 |
| 17 | 546 |
| 18 | 551 |
| 19 | 288 |
| ⋮ | ⋮ |
| ⋮ | ⋮ |
| 63 | 273 |

FIG. 8

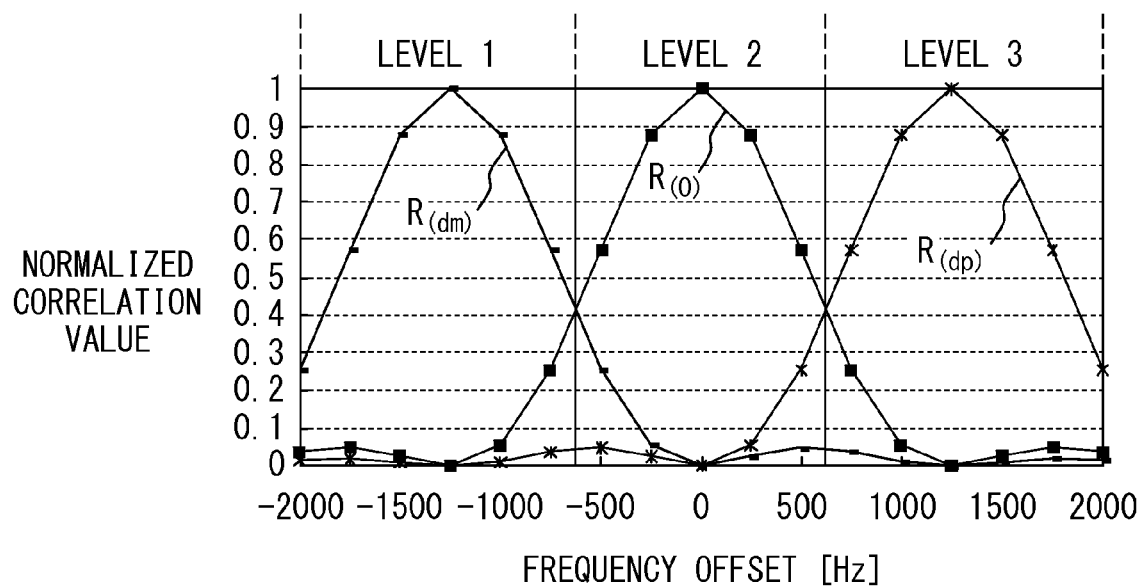
F I G. 9

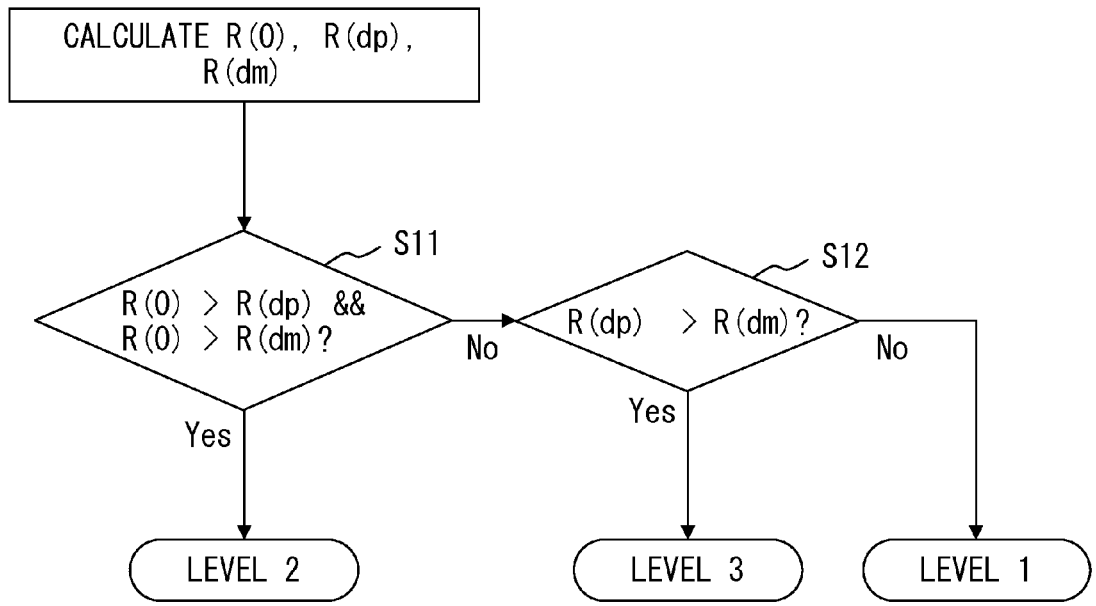
F I G. 1 2

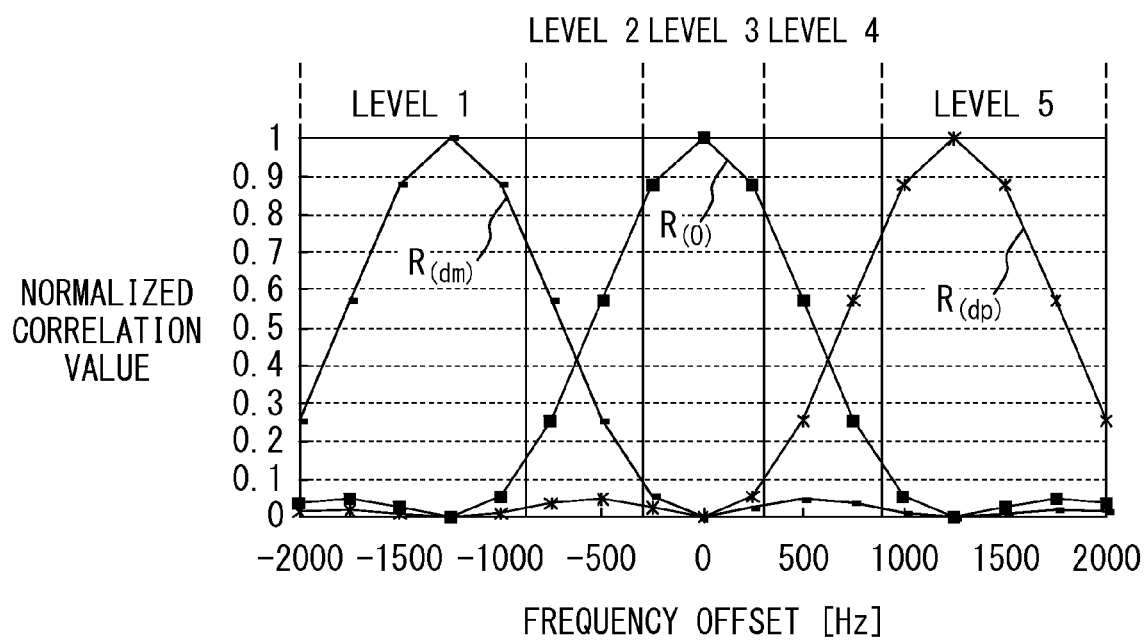
F I G. 1 3

APPARATUS AND METHOD FOR FREQUENCY OFFSET ESTIMATION

CROSS-REFERENCE TO RELATED APPLICATIONS

This application is a continuation of an international application PCT/JP2008/002272, which was filed on Aug. 21, 2008, the entire contents of which are incorporated herein by reference.

FIELD

The present invention relates to an apparatus and a method for estimating deviation of the frequency of a wireless signal in a wireless communication system.

BACKGROUND

In wireless communication, when a signal is transmitted while a transmitting station or a receiving station is moving, deviation (offset) occurs in the frequency of the received signal due to the Doppler shift. In order to demodulate/decode the received signal correctly, it is desirable that the frequency offset is estimated and corrected. In this regard, the higher the movement speed of the transmitting station or the receiving station, the larger the frequency offset, making the technique to estimate the frequency offset important.

FIG. 1 is a diagram illustrating the Doppler shift. Here, it is assumed that a frequency difference fu is set between the uplink frequency and the downlink frequency. That is, when the downlink frequency is fc, the uplink frequency is fc+fu. In addition, it is assumed that a Doppler shift fd occurs on the wireless link.

A wireless base station 101 transmits a downlink signal at the frequency fc. Then, the frequency of the received signal at a user terminal 102 becomes fc+fd due to the influence of the Doppler shift. Here, in cellular communication systems such as the LTE (Long Term Evolution) or the UMTS (Universal Mobile Telecommunications System), the user terminal 102 has an AFC (Automatic Frequency Control) circuit, and adjusts the transmission frequency using the downlink signal received from the wireless base station 101. Therefore, the user terminal 102 transmits an uplink signal at a frequency of fc+fu+fd. Then, the frequency of the received signal at the wireless base station 101 is fc+2fd+fu. That is, a frequency offset "2fd" is generated due to the Doppler shift.

The frequency offset is dependent on the movement speed of the mobile station (in FIG. 1, the user terminal 102) and the frequency band. For example, when the movement speed of the user terminal 102 is 350 km/h and the frequency band of the wireless signal is 2 GHz, the maximum value of the frequency offset "2fd" that occurs in the uplink is about 1300 Hz.

As a method for estimating the frequency offset described above, there is a technique in which a receiver estimates a phase rotation amount based on the correlation between a pilot signal received periodically and a predetermined reference signal, and calculates the frequency offset from the phase rotation amount (for example, WO93/22861).

However, in the conventional arts, the range in which the frequency offset can be estimated is narrow. For example, the message 3 in the LTE system belongs to the PUSCH (Physical Uplink Shared Channel). Here, in the message 3, as illustrated in FIG. 2, a pilot block is inserted at intervals of 0.5 millisecond. The frequency offset can be estimated using the pilot block, however, the frequency offset can be estimated only within the range of about ±1000 Hz. Meanwhile, in a configuration in which frequency hopping is implemented, it is practically impossible to estimate the frequency offset.

As described above, in the conventional arts, the range in which the frequency offset can be estimated has been narrow. Particularly, in a case in which the movement speed of the user terminal is high, it has been difficult to estimate the frequency offset.

SUMMARY

A frequency offset estimation apparatus according to an embodiment is used in a wireless communication system transmitting a preamble signal generated using a sequence where a position of a side peak in an autocorrelation property of the sequence is not dependent on frequency offset and a correlation value of the side peak changes according to the frequency offset. The frequency offset estimation apparatus includes a correlation unit configured to calculate autocorrelation of a received preamble signal; a detection unit configured to detect a position of a side peak of the autocorrelation of the preamble signal; a calculation unit configured to calculate a main correlation value representing correlation at a position of a main peak of the autocorrelation and a side correlation value representing correlation at the position of the side peak; and an estimation unit configured to estimate the frequency offset according to the main correlation value and the side correlation value.

In this configuration, the phase rotation amount that has occurred in the wireless transmission path does not need to be estimated using a pilot signal and the like. Therefore, the range in which frequency offset can be estimated does not become narrow. Meanwhile, the sequence is, for example, a Zadoff-Chu sequence.

A wireless base station may be configured to have the above described frequency offset estimation apparatus. In this case, the wireless base station may have a correction unit configured to correct the frequency of a received signal according to frequency offset estimated by the frequency offset estimation apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram presenting the configuration of a wireless communication system in which a method for estimating frequency offset in an embodiment is used.

FIG. 4 is a diagram presenting an example of the RACH procedure.

FIG. 5 is a diagram illustrating the reception timing.

FIG. 6 is a diagram illustrating the shift amount in calculating correlation.

FIG. 7B is a diagram presenting the relationship between the correlation value and the shift amount (Foff=400 Hz).

FIG. 7C is a diagram presenting the relationship between the correlation value and the shift amount (Foff=800 Hz).

FIG. 7E is a diagram presenting the relationship between the correlation value and the shift amount (Foff=−1250 Hz).

FIG. 8 is a diagram presenting the relationship between the sequence number of Zadoff-Chu sequence and the side peak position.

FIG. 9 is a diagram presenting the relationship between the frequency offset and the correlation value.

FIG. 12 is a flowchart of a process of estimating frequency offset.

FIG. 13 is a diagram illustrating a method for estimating frequency offset in five levels.

DESCRIPTION OF EMBODIMENTS

Figure 1:
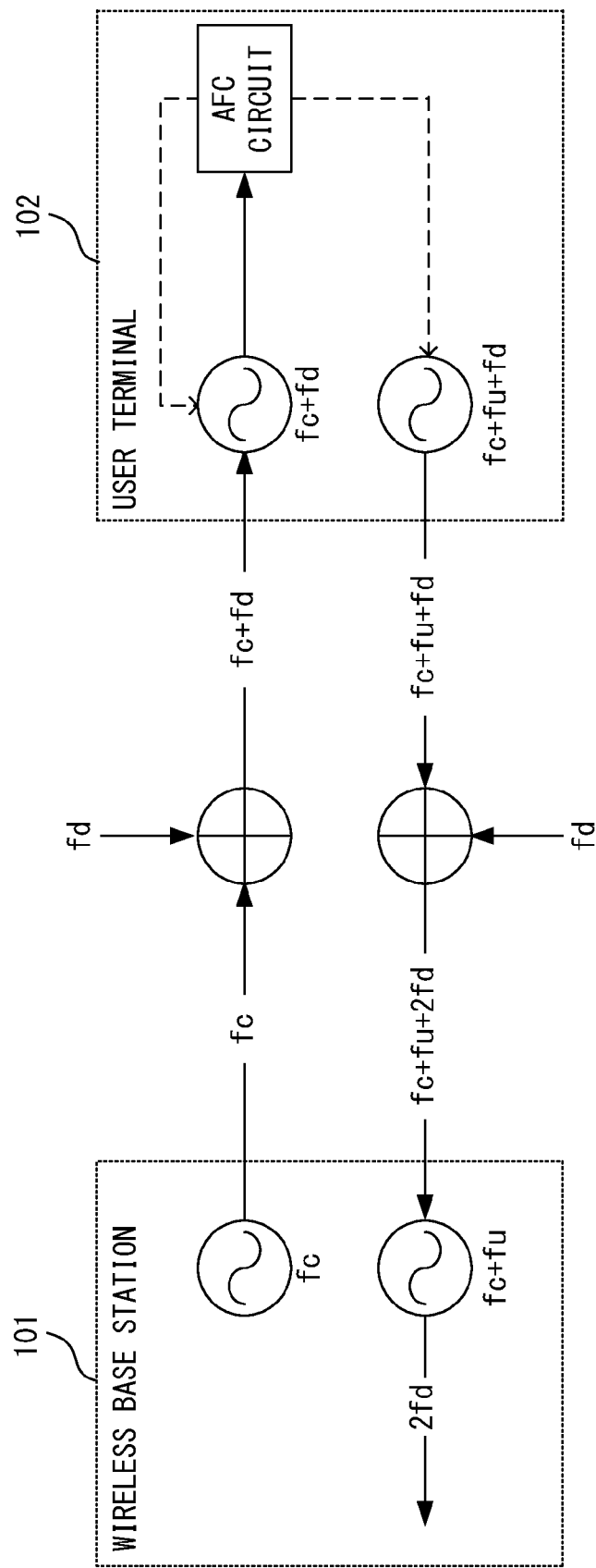
FIG. 1 is a diagram illustrating the Doppler shift.
Figure 2:
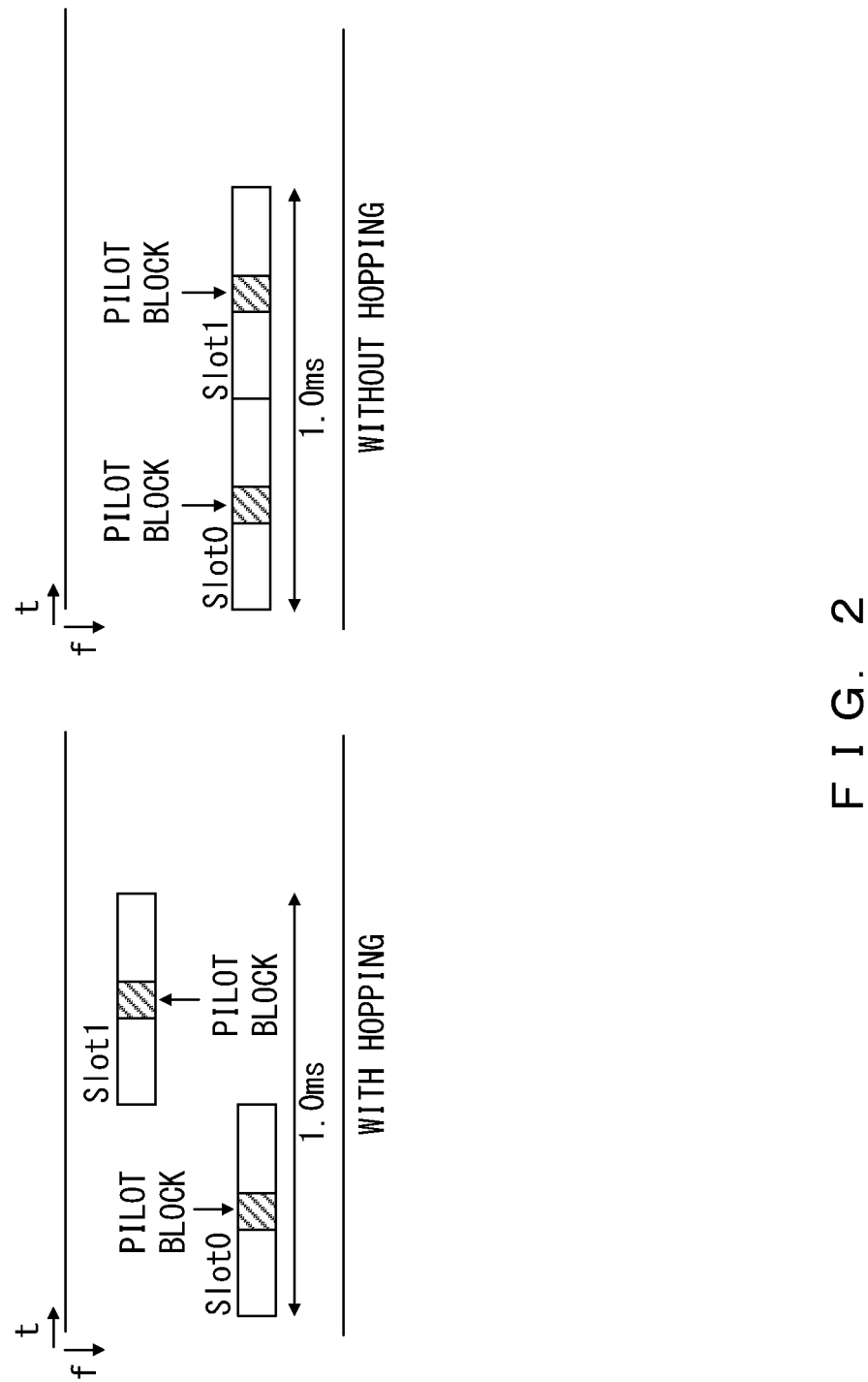
FIG. 2 is a diagram presenting the pilot block in the message 3 in the LTE.

FIG. 3 presents the configuration of a wireless communication system in which a method for estimating frequency offset of an embodiment is used. The wireless communication system is, in this embodiment, the LTE. The LTE is one of next-generation wireless communication standards, which supports higher movement speeds and frequency bands than the 3G system does.

A wireless base station 1 accommodates a plurality of user terminals 2 (2a-2d) located within a cell. The user terminals 2 access the wireless base station 1 using the RACH (Random Access Channel) and start communication. In the RACH, the initial access, timing control, and so on are performed.

FIG. 4 presents an example of the RACH procedure. The user terminal 2 selects a RACH preamble to be used from a plurality of RACH preambles that are prepared in advance in the wireless base station 1. In this embodiment, 64 RACH preambles 0-63 have been prepared. Then, the user terminal 2 selects one of unused RACH preamble and transmits it to the wireless base station as the message 1. In the example presented in FIG. 3, the user terminals 2a, 2b, 2c, 2d are connected to the wireless base station 1 with RACH preambles 5, 3, 7, 13, respectively.

The wireless base station 1 constantly monitors the arrival of the respective RACH preambles 0-63. Then, when the wireless base station 1 detects an RACH preamble, the wireless base station 1 returns an RACH response as the message 2. When the user terminal 2 receives the RACH response, the user terminal 2 transmits the UE number that identifies the user terminal, and so on, using the message 3. The wireless base station 1 returns the message 4 in response to the message 3.

Meanwhile, in the asynchronous RACH, the reception timing at the wireless base station 1 varies according to the position of the user terminal 2 in the cell. Therefore, when the wireless base station 1 detects an RACH preamble, the wireless base station 1 measures the reception timing of the RACH preamble. The reception timing is measured in the following procedure for example. Meanwhile, it is assumed that the wireless base station 1 holds replicas of the RACH preambles 0-63. The processes of steps S1-S3 described below are performed for each of the 64 RACH preambles.

In step S1, a correlation profile of a received signal and each RACH preamble replica is generated. That is, 64 correlation profiles are generated. The correlation profile represents the temporal change of the correlation value.

In step S2, the maximum peak of each correlation profile is detected. When a maximum peak that is larger than a predetermined correlation threshold value is detected, it is determined that an RACH preamble is received. At this time, the timing at which the maximum peak that is larger than the correlation threshold value is detected is the reception timing of the RACH preamble.

In step S3, as illustrated in FIG. 5, a difference D between the reference timing and the reception timing is detected. Meanwhile, the RACH response may include a command to correct the difference D. In this case, the user terminal 2 can establish synchronization using the RACH response.

In the wireless communication system of the embodiment, the RACH preamble is generated using the Zadoff-Chu sequence. The common expression of the Zadoff-Chu sequence is as in mathematical expression (1) below.

$$x_u(n) = e^{-j\frac{\pi u\{2qn+n(n+1)\}}{L}}, 0 \le n \le L-1 \quad (1)$$

In the mathematical expression (1) above, "u" represents the sequence number that defines the pattern of the Zadoff-Chu sequence. In this example, since 64 RACH preambles are generated, 64 sequence numbers "u" that are different from each other are used. "n" represents the symbol number that identifies a symbol in the Zadoff-Chu sequence. "L" represents the length of the Zadoff-Chu sequence. Meanwhile, "u", "n", "L", "q" are all integers. In addition, "u" and "L" are coprime.

In the LTE system, "q=0", and "L" is a prime (in this example, "839"). That is, the Zadoff-Chu sequence is expressed with 839 symbols. In this case, the Zadoff-Chu sequence is expressed by mathematical expression (2) below.

$$x_u(n) = e^{-j\frac{\pi un(n+1)}{L}}, 0 \le n \le L-1 \quad (2)$$

In the RACH procedure of the LTE, the Zadoff-Chu sequence expressed by the mathematical expression (2) above is transmitted from the user terminal 2, propagated over the wireless transmission path, and received by the wireless base station. Here, it is assumed that a frequency offset Foff occurs due to the Doppler shift and so on in the wireless transmission path. In this case, the received sequence Yu(n, Foff) is expressed by mathematical expression (3) below.

$$y_u(n, F_{off}) = e^{-j\frac{2\pi n}{L}F_{off}T}x_u(n) \quad (3)$$

In the mathematical expression (3), "T" is a temporal length of the Zadoff-Chu sequence, which is 0.8 millisecond in the LTE.

In the reception apparatus, the correlation between the replica sequence Xu and the received sequence Yu is calculated. The replica sequence Xu is the Zadoff-Chu sequence transmitted from the transmission apparatus, which is expressed by the mathematical expression (2). The received sequence Yu is the Zadoff-Chu sequence that was transmitted from the transmission apparatus and received by the reception apparatus. That is, the autocorrelation with respect to the Zadoff-Chu sequence is calculated. In this case, the correlation value R is expressed by mathematical expression (4) below.

$$R_u(s, F_{off}) = |y(s, F_{off}) * x(s)| = \frac{1}{L}\left|\sum_{n=0}^{L-1} e^{j2\pi n(us+F_{off}T)/L}\right| \quad (4)$$

"s" represents the shift amount between the replica sequence Xu and the received sequence Yu, as presented in FIG. 6.

Here, it is assumed that the frequency offset Foff is zero in the mathematical expression (4). That is, it is assumed that the Zadoff-Chu sequence transmitted from the transmitter is received by the reception apparatus without change in the frequency. In this case, the calculation result of the correlation value Ru is as follows.

$$R_u(s, 0) = \begin{cases} 1 & \dots s = 0 \\ 0 & \dots s = 1, \dots, L-1 \end{cases} \quad (5)$$

Thus, the Zadoff-Chu sequence has an ideal autocorrelation property.

However, when the frequency offset Foff occurs due to the Doppler shift and so on in the wireless transmission path, the autocorrelation property of the Zadoff-Chu sequence deteriorates. The relationship between the frequency offset and the correlation value is described with reference to FIG. 7A-FIG. 7E. In FIG. 7A-FIG. 7E, "u=5" and "L=839" are assumed.

Figure 7A:
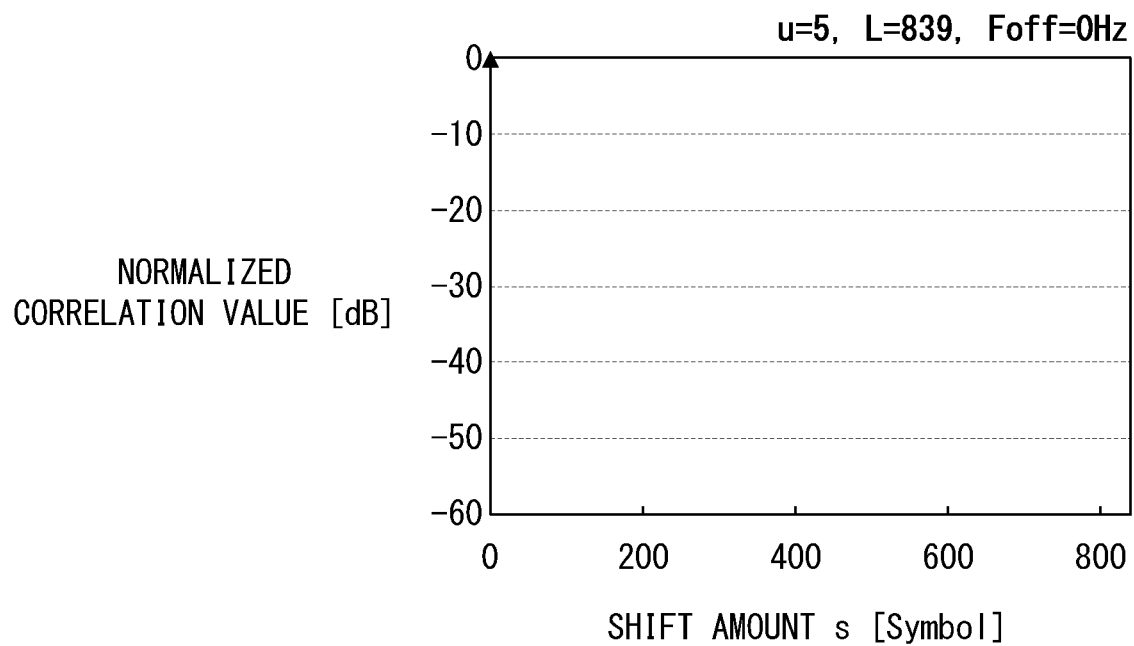
FIG. 7A is a diagram presenting the relationship between the correlation value and the shift amount (Foff=0).

FIG. 7A presents the relationship between the correlation value and the shift amount in the case of "Foff=0". In this case, as described above, the normalized correlation value R is 1, when the shift amount s is zero. However, when the shift amount s changes, the correlation value R becomes zero. Note that the peak of the correlation value R obtained when the shift amount s is zero is referred to as the "main peak".

FIG. 7B presents the relationship between the correlation value and the shift amount in the case of "Foff=400 Hz". Generally, when the user terminal 2 moves in the direction in which the distance between the wireless base station 1 and the user terminal 2 becomes smaller, positive frequency offset is obtained. On the other hand, when the user terminal 2 moves in the direction in which the distance between the wireless base station 1 and the user terminal 2 becomes larger, negative frequency offset is obtained. In the case of "Foff=400 Hz", the correlation value R becomes the maximum when the shift amount s=zero. In addition, the correlation value R has the second largest value when the shift amount s=168. Furthermore, the correlation value R has the third largest value when the shift amount s=671.

FIG. 7C presents the relationship between the correlation value and the shift amount in the case of "Foff=800 Hz". In the case of "Foff=800 Hz", the correlation value R becomes the maximum when the shift amount s=168. In addition, the correlation value R has the second largest value when the shift amount s=zero. Furthermore, the correlation value R has the third largest value when the shift amount s=671.

Thus, in the case in which "u=5", "L=839", the peak of the correlation value R appears not only when the shift amount s is zero but also when the shift amount s changes. Here, the position on which the maximum side peak is obtained when the frequency offset Foff is a positive value (for example, Foff=400 Hz) is referred to as "dp", and the position on which the maximum side peak is obtained when the frequency offset Foff is a negative value (for example, Foff=-400 Hz) is referred to as "dm". Then, the following relationship is established.

$$\text{Mod}(u \times dp, L) = 1$$

$$L - dp = dm$$

Figure 7D:
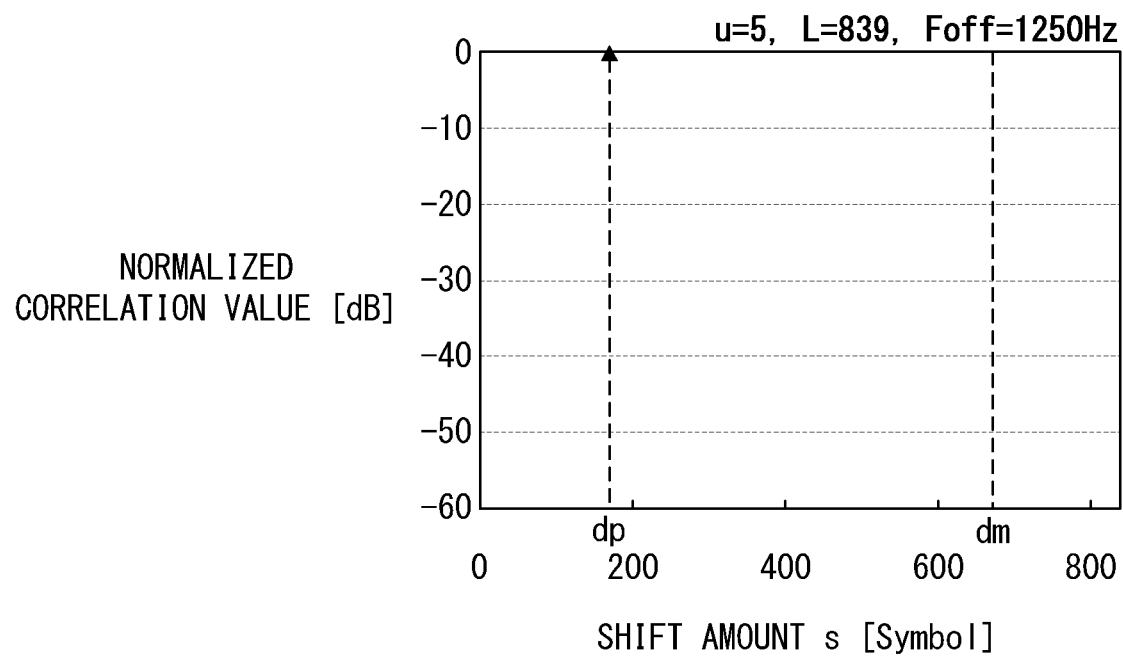
FIG. 7D is a diagram presenting the relationship between the correlation value and the shift amount (Foff=1250 Hz).

FIG. 7D presents the relationship between the correlation value and the shift amount in the case of "Foff=1250 Hz" In this case, the normalized correlation value R is 1, when the shift amount s=168. However, when the shift amount s changes, the correlation value R becomes zero.

FIG. 7E presents the relationship between the correlation value and the shift amount in the case of "Foff=-1250 Hz" In this case, the normalized correlation value R is 1, when the shift amount s=671. However, when the shift amount s changes, the correlation value R becomes zero.

Thus, in the case in which "u=5", "L=839", the correlation value R has a peak when the shift amount is zero, 168 or 671. That is, even if the frequency offset Foff changes, the side peak positions dp and dm do not change. In other words, the side peak positions dp and dm are not dependent on the frequency offset Foff. However, the correlation value R at the side peak positions dp and dm changes according to the frequency offset Foff.

FIG. 8 presents the relationship between the sequence number of the Zadoff-Chu sequence and the side peak position. As described above, in the wireless communication system of the embodiment, 64 RACH preambles that are different from each other exist in the cell. A corresponding Zadoff-Chu sequence is assigned to each RACH preamble. In the example presented in FIG. 8(*a*), a sequence number u=3 is assigned to the RACH preamble 0, and a sequence number u=836 is assigned to the RACH preamble 1. The Zadoff-Chu sequence is obtained by giving the sequence number to the mathematical expression (2).

The side peak position dp is determined uniquely for the sequence number u of the Zadoff-Chu sequence. In the examples presented in FIG. 7A-7E, the side peak position dp=168 is obtained for the sequence number u=5. In addition, as presented in FIG. 8(*a*) and FIG. 8(*b*), for example, when the sequence number u=3 (that is, the RACH preamble 0), the side peak position dp=280 is obtained, and when the sequence number u=836 (that is, the RACH preamble 1), the side peak position dp=559 is obtained. Or, since the user terminal 2*a* illustrated in FIG. 3 accesses the wireless base station 1 using the RACH preamble 5, in this case, the sequence number u=817, and the side peak position dp=572 are obtained in the wireless base station 1.

Meanwhile, the side peak position dm is determined uniquely from the side peak position dp. Therefore, the side peak positions dp and dm are determined uniquely with respect to the sequence number u of the Zadoff-Chu sequence.

FIG. 9 presents the relationship between the frequency offset and the correlation value. Here, the relationship between the correlation value R(0) at the main peak position, the correlation value R(dp) at the side peak position dp, the correlation value R(dm) at the side peak position dm, and the frequency offset Foff is presented. This relationship is not dependent on the sequence number u.

As illustrated in FIG. 9, in the range in which the frequency offset Foff is small, the correlation value R(0) is the largest. That is, the correlation value R(dp) and the correlation value R(dm) are smaller than the correlation value R(0). In this example, the correlation value (0) is the largest when the frequency offset Foff is within the range of ±625 Hz.

When the frequency offset Foff is larger than 625 Hz, the correlation value R(dp) is the largest. In this region, the correlation value R(0) and the correlation value R(dm) are smaller than the correlation value R(dp), On the other hand, when the frequency offset Foff is larger than −625 Hz in the negative region, the correlation value R(dm) is the largest. That is, in this region, the correlation value R(0) and the correlation value R(dp) are smaller than the correlation value R(dm).

Thus, in the wireless communication system of the embodiment the relationship between the three correlation values (R(0), R(dp), R(dm)) is determined uniquely according to the frequency offset. Specifically, for example, the combinations of "R(dp)/R(0)" and "R(dm)/R(0)" are determined uniquely. Therefore, by calculating the three correlation values (R(0), R(dp), R(dm)), the frequency offset Foff can be estimated based on the correlation values.

First Embodiment

Figure 10:
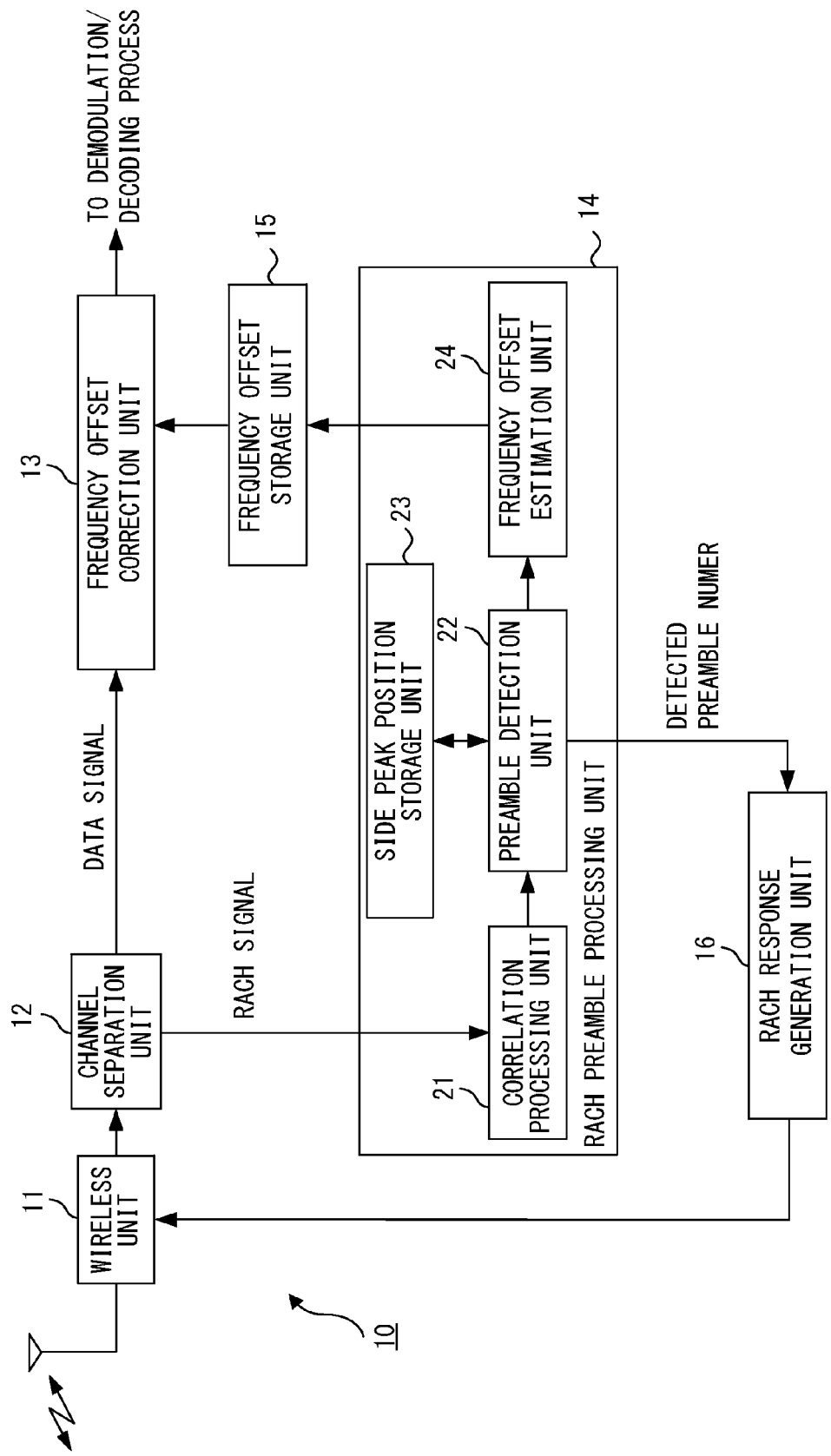
FIG. 10 is a diagram presenting the configuration of a wireless base station according to the first embodiment.

FIG. 10 presents the configuration of a wireless base station according to the first embodiment. A wireless base station 10 according to the first embodiment corresponds to the wireless base station 1 presented in FIG. 1, and accommodates the user terminal 2. In addition, the wireless base station 10 performs the RACH procedure presented in FIG. 4 with the user terminal 2. Here, it is assumed that the RACH preamble is generated using the Zadoff-Chu sequence in the mathematical expression (2) mentioned above. The sequence number u of the Zadoff-Chu sequence is determined by the user terminal 2.

The wireless base station 10 has a wireless unit 11, a channel separation unit 12, a frequency offset correction unit 13, a RACH preamble processing unit 14, a frequency offset storage unit 15, and RACH response generation unit 16. The wireless unit 11 receives a signal transmitted from the user terminal 2 and converts the received into a baseband signal. The baseband signal is further converted into a digital signal by A/D conversion. The channel separation unit 12 separates an RACH signal from the received signal. The RACH signal is guided to the RACH preamble processing unit 14, and the data signal is guided to the frequency offset correction unit 13. The data signal includes, for example, a PUSCH (Physical Uplink Shared Channel). The frequency offset correction unit 13 corrects the frequency offset of the data signal according to frequency offset information stored in the frequency offset storage unit 15. The data signal whose frequency offset has been corrected is sent to a demodulation/decoding unit.

The RACH preamble processing unit 14 detects a RACH preamble. In addition, the RACH preamble processing unit 14 estimates frequency offset that has occurred in the wireless transmission path. Frequency offset information that represents the estimated frequency offset is stored in the frequency offset storage unit 15, and used by the frequency offset correction unit 13. The RACH response generation unit 16 generates a corresponding RACH response when a RACH preamble is detected in the RACH preamble processing unit 14. The generated RACH response is returned to the user terminal 2 via the wireless unit 11.

The RACH preamble processing unit 14 has a correlation processing unit 21, a preamble detection unit 22, a side peak position storage unit 23, a frequency offset estimation unit 24. The correlation processing unit 21 holds replicas of 64 preambles that are assigned to the wireless base station 10. Each replica is obtained by the Zadoff-Chu sequence in the expression (2) mentioned above. It is assumed in this example that the sequence numbers in the 64 Zadoff-Chu sequences held as the replicas are different from each other. The correlation processing unit 21 calculates the correlation between a received signal and each replica (0-63). That is, 64 correlation profiles are obtained. The correlation profile includes, in this example, as illustrated in FIG. 6, 839 correlation values R(0)-R(838) obtained by performing symbol-by-symbol cyclic shift of replica data.

The preamble detection unit 22 detects an RACH preamble based on the 64 correlation profiles obtained by the correlation processing unit 21. That is, when a correlation value that is larger than a predetermined correlation threshold value is detected, it is determined that an RACH preamble is received. For example, when the maximum value of the correlation between a received signal and a replica 0 (the replica of the RACH preamble 0) is larger than the correlation threshold value, it is determined that the RACH preamble 0 is received. In the similar manner, when the maximum value of the correlation between a received signal and a replica 1 (the replica of the RACH preamble 1) is larger than the correlation threshold value, it is determined that the RACH preamble 1 is received.

The preamble detection unit 22 refers to the side peak position storage unit 23 and calculates the side peak position that corresponds to the received RACH preamble. The side peak position represents a particular position on which the autocorrelation of the RACH preamble has a peak. Here, as explained with reference to FIG. 7A-7E, the side peak position is determined uniquely corresponding to the sequence number u of the Zadoff-Chu sequence without depending on the frequency offset Foff. Therefore, in the wireless base station 10, as illustrated in FIG. 8, the correspondence relationship between the sequence number u of the Zadoff-Chu sequence and the side peak position dp has been obtained in advance. The correspondence relationship table presented in FIG. 8 is stored in the side peak position storage unit 23.

For example, when the RACH preamble 0 is detected (that is, the sequence number u=3), "dp=280" is obtained as the side peak position by referring to the table illustrated in FIG. 8. In addition, from the relationship "dm=L−dp", "dm=559" is obtained.

Figure 11:
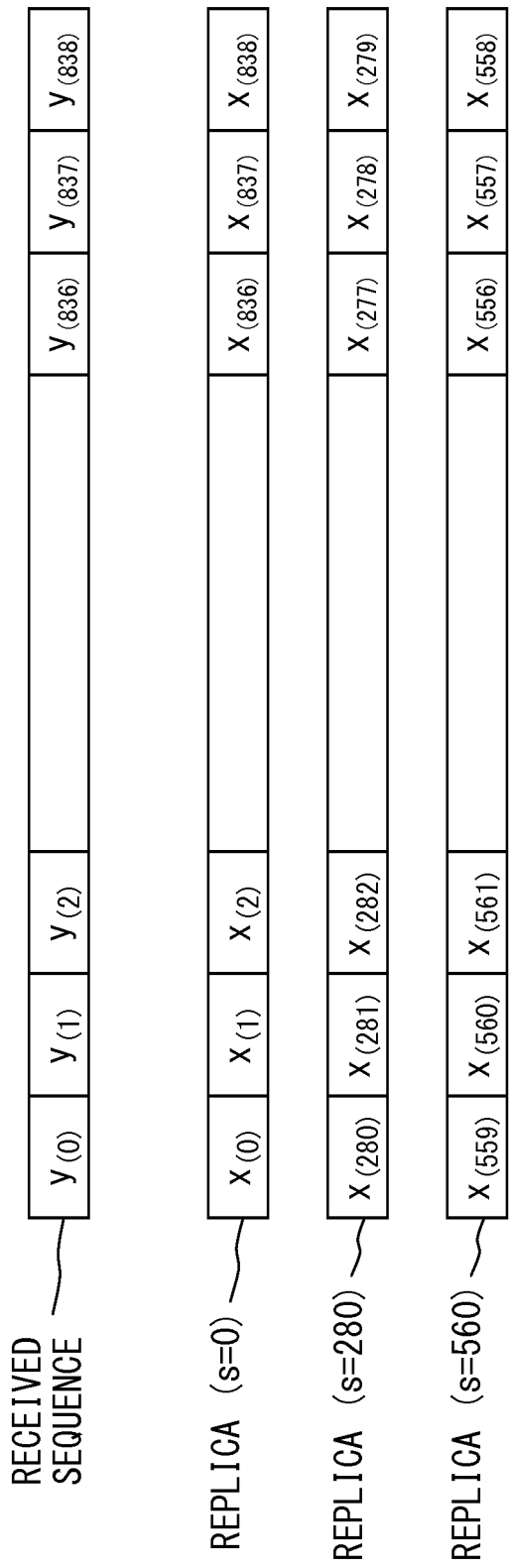
FIG. 11 is a diagram illustrating a method for calculating R(0), R(dp), R(dm).

The preamble detection unit 22 extracts the correlation value R(0) at the main peak position, the correlation value R(dp) at the side peak position dp, and the correlation value R(dm) at the side peak position dm from the correlation profile calculated by the correlation processing unit 21, and gives the correlation values to the frequency offset estimation unit 24. For example, in a case in which "dp=280" and "dm=559", the correlation values R(0), R(dp), R(dm) are obtained by correlation calculation presented in FIG. 11. That is, the correlation value R(0) is obtained by calculating the correlation between the received sequence Y and a replica X(0). For example, complex multiplication of each symbol of the received signal and complex conjugate of corresponding symbol of the replica is calculated, and the correlation value is obtained as sum of the respective multiplication results. In the similar manner, the correlation value R(280) is obtained by calculating the correlation between the received sequence Y and the replica X(280). The replica X(280) is obtained by performing cyclic shift of the replica X(0) by 280 symbols. In addition the correlation value R(559) is obtained by calculating the correlation between the received sequence Y and the replica X(559). The replica X(559) is obtained by performing cyclic shift of the replica X(0) by 559 symbols.

The frequency offset estimation unit 24 estimates the frequency offset Foff that has occurred in the wireless transmission path due to the Doppler shift and the like, according to the correlation values R(0), R(dp), R(dm). The frequency offset Foff is estimated according to the flowchart presented in FIG. 12, in this example.

In step S11, the correlation value R(0) and the correlation value R(dp) are compared, and the correlation value R(0) and the correlation value R(dm) are compared. Then, if "R(0)>R (dp)" and "R(0)>R(dm)", it is determined that the frequency offset Foff belongs to the level 2 presented in FIG. 9. That is, it is determined that the frequency offset Foff is within the range of "from −625 Hz to 625 Hz". In this case, "zero Hz" is output as the estimated value of the frequency offset Foff.

In step S12, the correlation value R(dp) and the correlation R(dm) are compared. In this comparison, if "R(dp)>R(dm)", it is determined that the frequency offset Foff belongs to the level 3 presented in FIG. 9. That is, it is determined that the frequency offset Foff is within the range of "from 625 Hz to 2000 Hz". In this case, "1250 Hz" is output as the estimated value of the frequency offset Foff.

If "R(dp)<R(dm)", it is determined that the frequency offset Foff belongs to the level 1 presented in FIG. 9. That is, it is determined that the frequency offset Foff is within the range of "from −2000 Hz to −625 Hz." In this case, "−1250 Hz" is output as the estimated value of the frequency offset Foff.

The frequency offset storage unit 15 stores the frequency offset Foff output from the frequency offset estimation unit 24 as described above. Then, the frequency offset correction unit 13 corrects the frequency offset of the data signal according to the frequency offset Foff stored in the frequency offset storage unit 15. For example, if the estimated value of the frequency offset Foff is "zero Hz". The frequency offset correction unit 13 does not correct the frequency of the data signal. If the estimated value of the frequency offset Foff is "1250 Hz", the frequency offset correction unit 13 corrects the frequency offset by giving phase rotation corresponding to "1250 Hz" to the data signal. In the similar manner, if the estimated value of the frequency offset Foff is "−1250 Hz", the frequency offset correction unit 13 corrects the frequency offset by giving phase rotation corresponding to "−1250 Hz" to the data signal. Correction of frequency offset in this manner improves the accuracy of demodulation/decoding.

Thus, according to the method of the embodiment, since frequency offset is estimated according to the correlation values R(0), R(dp), R(dm), the frequency range in which the estimation can be performed is widened. In the example presented in FIG. 9, frequency offset can be estimated in the range of ±2000 Hz. In addition, since the calculation amount in the process in the flowchart presented in FIG. 12 performed for the frequency offset estimation is very small, the load for the processor is small.

In the example described above, the frequency offset Foff is estimated in three levels, however finer estimation may also be performed. Here, as illustrated in FIG. 13, an example in which the frequency offset Foff is estimated in five levels is presented.

Figure 14:
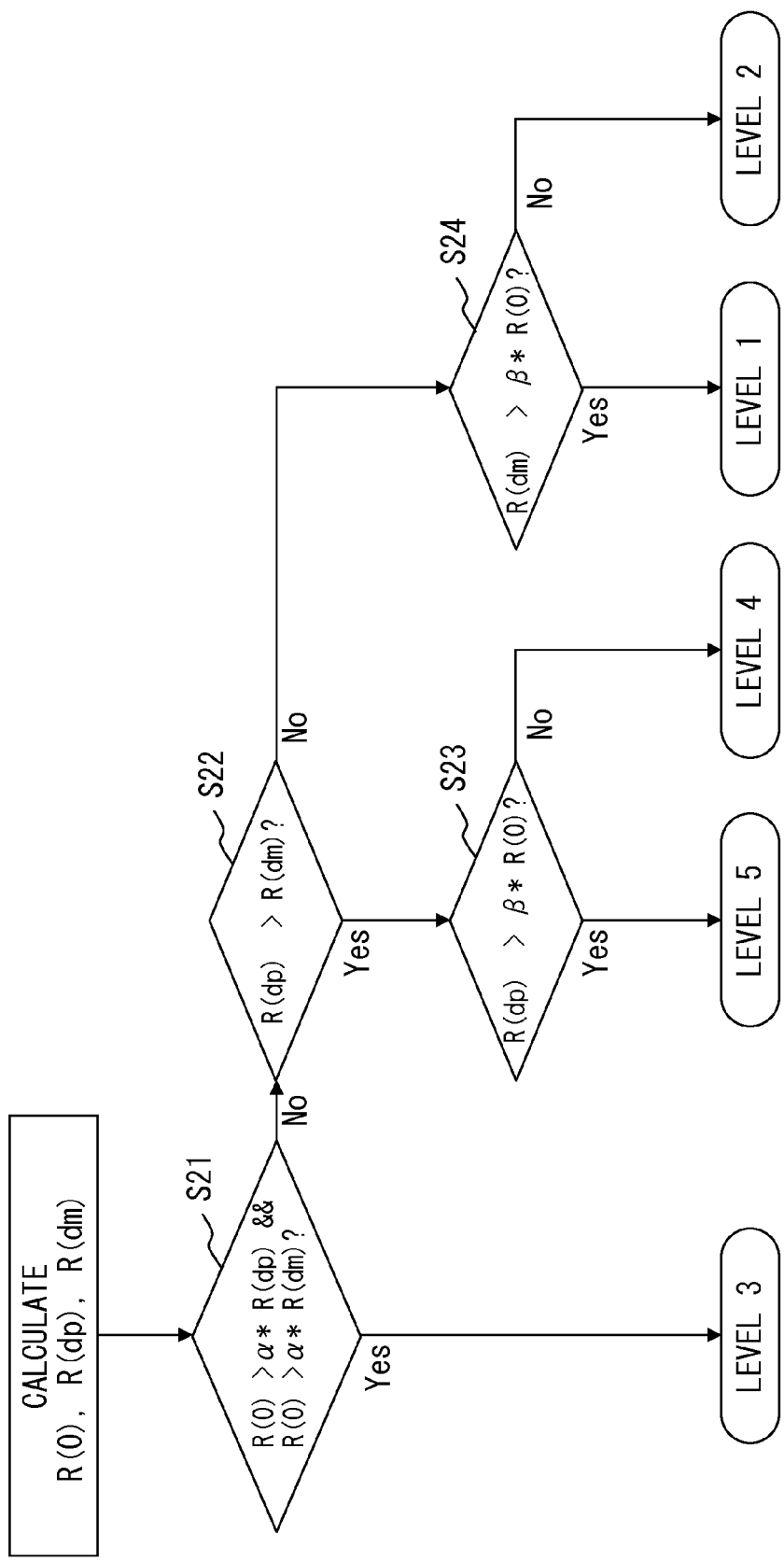
FIG. 14 is a flowchart of a process of estimating frequency offset in five levels.

FIG. 14 is a flowchart of a process of estimating the frequency offset Foff in five levels. In this case also, it is assumed that the three correlation values R(0), R(dp), and R(dm) are given.

In step S21, whether or not "R(0)>αR(dp)" and "R(0)>αR(dm)" is checked. Here, "α=2". If this condition is satisfied, it is determined that the frequency offset Foff belongs to the level 3 presented in FIG. 13. In this case, "zero Hz" is output as the estimated value of the frequency offset Foff.

If the condition in step S21 is not satisfied, whether or not "R(dp)>R(dm)" is checked. If this condition is satisfied, the process moves to step S23, and if this condition is not satisfied, the process moves to step S24.

In step S23, whether or not "R(dp)">βR(0)" is checked. In this example, "β=3". Then, if the condition is satisfied, it is determined that the frequency offset Foff belongs to the level 5, and "1250 Hz" is output as the estimated value of the frequency offset Foff. On the other hand, if the condition in step S23 is not satisfied, it is determined that the frequency offset Foff belongs to the level 4, and "650 Hz" is output as the estimated value of the frequency offset Foff.

In step S24, whether or not "R(dm)>βR(0) is checked. If the condition is satisfied, it is determined that the frequency offset Foff belongs to the level 1, and "−1250 Hz" is output as the estimated value of the frequency offset Foff. On the other hand, if the condition in step S24 is not satisfied, it is determined that the frequency offset Foff belongs to the level 2, and "−650 Hz" is output as the estimated value of the frequency offset Foff.

Note that the RACH preamble transmitted in the RACH procedure in the LTE is explained in this example, however this is not a limitation. For example, the above described method may be applied to other wireless communication systems (for example, WiMAX, wireless LAN etc.). In addition, the method of the embodiment is applicable also to the cases in which the frequency offset is estimated using other preamble signals or various reference signals. These modifications may be applied to other embodiments.

Second Embodiment

Figure 15:
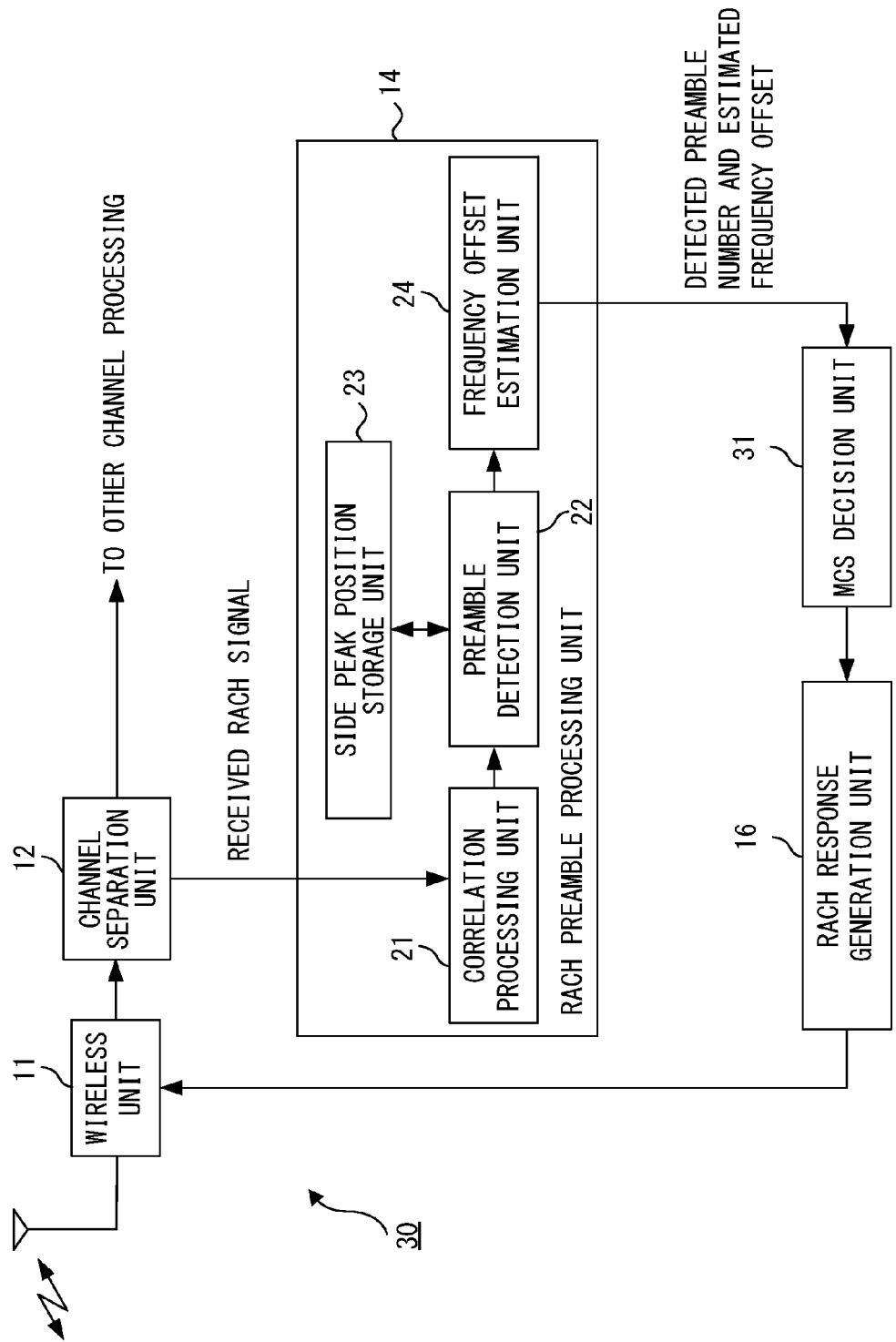
FIG. 15 is a diagram presenting the configuration of a wireless base station according to the second embodiment.

FIG. 15 illustrates the configuration of a wireless base station according to the second embodiment. A wireless base station 30 according to the second embodiment has a MCS (Modulation and channel Coding Scheme) decision unit 31. The MCS decision unit 31 decides an optimal MCS for transmitting the RACH response according to the frequency offset Foff estimated by the frequency offset estimation unit 24. For example, if the absolute value of the frequency offset Foff is equal to or smaller than 625 Hz, QPSK or 16QAM is selected as the modulation scheme, and "⅔" is selected as the encoding ratio. On the other hand, if the absolute value of the frequency offset Foff is larger than 625 Hz, QPSK or BPSK is selected as the modulation scheme, and "⅓" is selected as the encoding ratio.

Thus, in the second embodiment, the RACH response is transmitted by MCS with high transmission efficiency when the frequency offset is small. On the other hand, when the frequency offset is large, the RACH response is transmitted by an MCS with high reliability. Meanwhile, the MCS decision unit 31 may decides the MCS for transmitting other downlink signals according to the estimated frequency offset Foff.

Note that the wireless base station 30 according to the second embodiment may also have the frequency offset correction unit 13 in the similar manner as in the first example.

Third Embodiment

Figure 16:
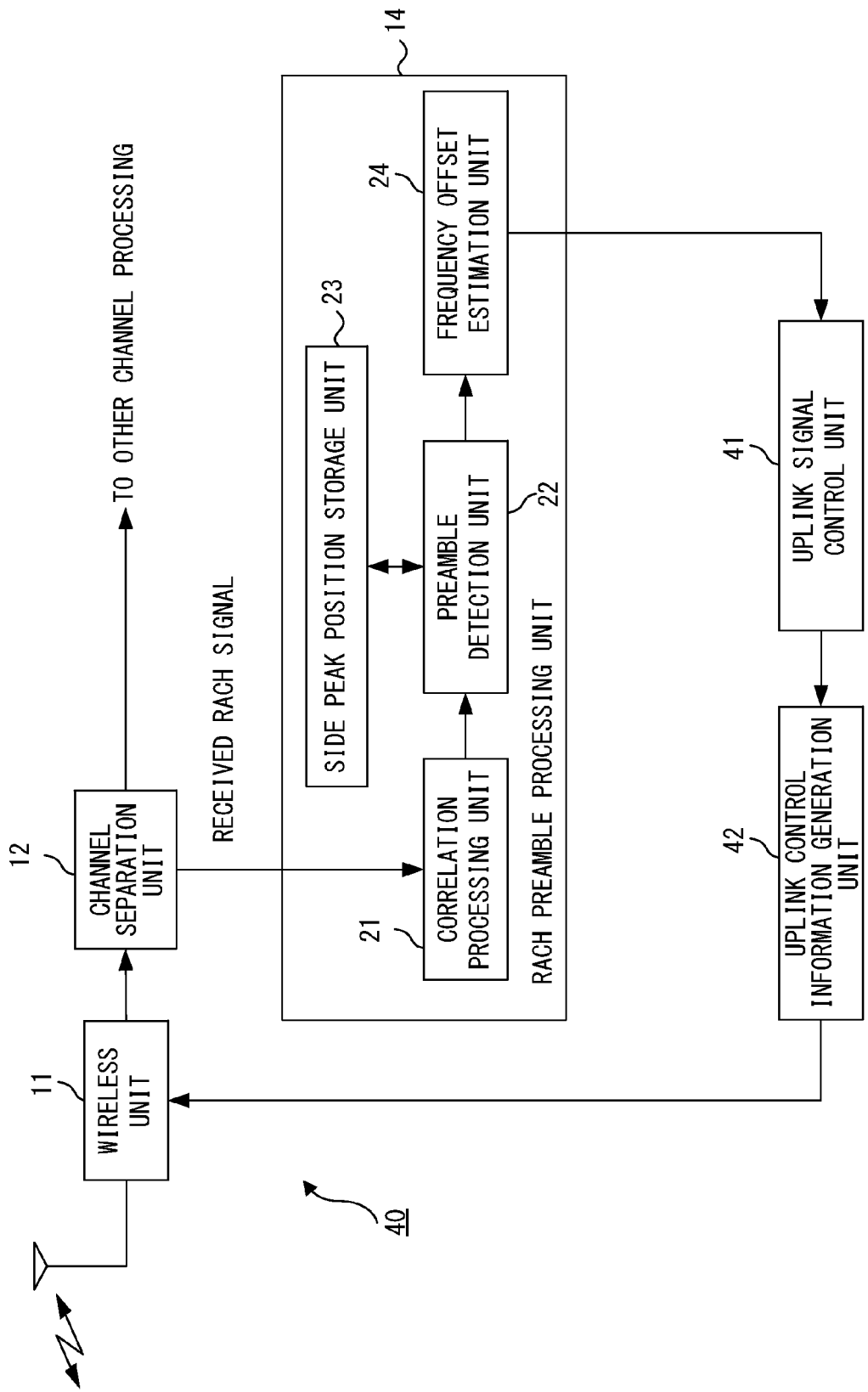
FIG. 16 is a diagram presenting the configuration of a wireless base station according to the third embodiment.

FIG. 16 is a diagram illustrating the configuration of a wireless base station according to the third embodiment. A wireless base station 40 according to the third embodiment has an uplink signal control unit 41 and an uplink control information generation unit 42. The uplink signal control unit 41 determines an optimal MCS for transmitting the RACH response according to the estimated frequency offset Foff in the same manner as the MSC decision unit 31. The uplink control information generation unit 42 generates uplink control information for notification of the determined MCS to the user terminal 2. Notification of the uplink control information is performed to a corresponding user terminal 2. When the user terminal 2 receives the uplink control information, the user terminal 2 transmits the message 3 or other signals according to the notified MCS.

Note that the wireless base station 40 according to the third embodiment may also have the frequency offset correction unit 13 in the similar manner as in the first example.

Fourth Embodiment

In a case such as when the noise in the wireless transmission path is large, the autocorrelation property obtained in the wireless base station 1 deteriorates. The accuracy of frequency offset estimation is low if the autocorrelation property has deteriorated. The reception characteristics may worsen if the frequency of a received signal is corrected according to the frequency offset for which estimation accuracy is low.

For this reason, in the fourth embodiment, the frequency offset is estimated only when the sum of the three correlation values R(0), R(dp), and R(dm) is larger than a predetermined threshold value. In other words, when the sum of the three correlation values R(0), R(dp), and R(dm) is smaller than the predetermined threshold value, the frequency offset is not estimated. This prevents degradation of the reception characteristics due to frequency offset estimation.

Fifth Embodiment

In the examples described above, sequence numbers u that are different from each other are assigned to a plurality of RACH preamble used in the same cell. However, as long as distinguishable in the wireless base station 1, different sequence numbers u do not have to be assigned to all of the RACH preambles.

Figure 17:
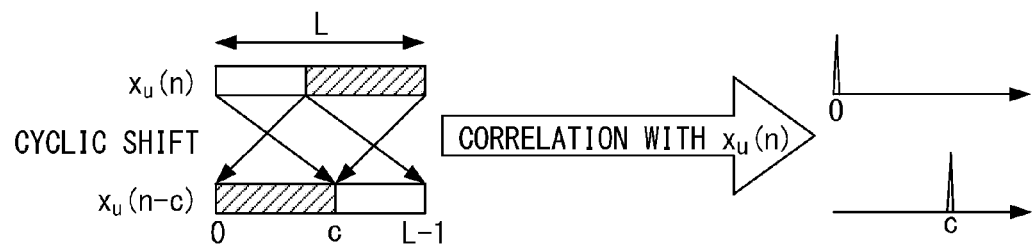
FIG. 17 is a diagram presenting the cyclic shift.

For example, as illustrated in FIG. 17, a sequence X(c) is generated by performing cyclic shift of the sequence X(0) by c symbols in the user terminal 2. Here, if the time length corresponding to the number of symbols of the cyclic shift is larger than the maximum delay time in the cell, the sequence X(0) and the sequence X(c) do not interfere with each other, and the sequence X(0) and the sequence X(c) are distinguishable from each other in the wireless base station 1. In this case, it is desirable that the wireless base station 1 performs shift in the opposite direction by the amount of cyclic shift when generating the correlation profile.

In addition, a cyclic prefix may be attached to the head of the RACH preamble generated using the Zadoff-Chu sequence. The attachment of the cyclic prefix makes the processing in the frequency domain easy.

Meanwhile, in an asynchronous RACH, the correlation profile is generated taking the difference D presented in FIG. 5 into consideration. Then, to estimate the frequency offset Foff, correlation values R(tr), R(dp+tr), R(dm+tr) are used instead of the correlation values R(0), R(dp), R(dm). Here, "tr" is a value in which the difference D presented in FIG. 5 is converted into the number of symbols.

Another Aspect

Figure 18:
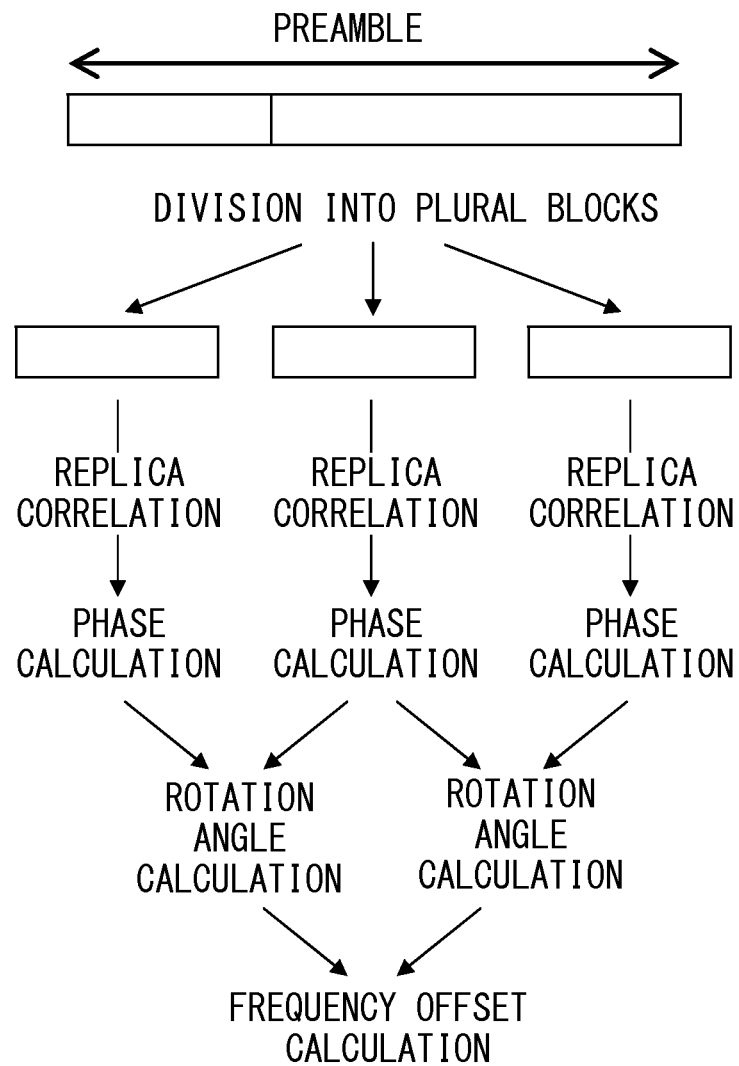
FIG. 18 is a diagram illustrating a method for estimating frequency offset in another aspect.

FIG. 18 illustrates a method for estimating frequency offset in another aspect. In another aspect, as illustrated in FIG. 18, a preamble generated using the Zadoff-Chu sequence is divided into a plurality of data blocks. Then, in the receiving station, the correlation between each divided data block and each corresponding divided replica is calculated. That is, for each divided data block, the autocorrelation is calculated respectively. Next, each phase is calculated according to the correlation for each data block, and the phase change amount per unit time (that is, the rotation angle) is calculated according to the difference between the phases. Then, frequency offset can be calculated according to the rotation angle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. A frequency offset estimation apparatus used in a wireless communication system transmitting a preamble signal generated using a sequence where a position of a side peak in an autocorrelation property of the sequence is not dependent on frequency offset and a correlation value of the side peak changes according to the frequency offset, comprising:
a correlation unit configured to calculate autocorrelation of a received preamble signal;
a detection unit configured to detect a position of a side peak of the autocorrelation of the preamble signal;
a calculation unit configured to calculate a main correlation value representing correlation at a position of a main peak of the autocorrelation and a side correlation value representing correlation at the position of the side peak; and
an estimation unit configured to estimate the frequency offset when a sum of the main correlation value and the two side correlation values is larger than a predetermined correlation threshold value, and the estimate of the frequency offset is performed by estimating the frequency offset within a range of frequency offset by comparing the main correlation value to each of the two side correlation values and, based on the comparing of the main correlation value, further comparing the two side correlation values to each other.

2. The frequency offset estimation apparatus according to claim 1, wherein the sequence is Zadoff-Chu sequence.

3. The frequency offset estimation apparatus according to claim 2, wherein correlation values at positions distant from the position of the main peak by dp and dm are calculated as side peaks, where (u·dp) modulo L=1, dm=L−dp.

4. The frequency offset estimation apparatus according to claim 2, wherein
the Zadoff-Chu sequence is expressed in an expression below, where u represents a sequence number defining a pattern of the Zadoff-Chu sequence, n represents a symbol number identifying a symbol in the Zadoff-Chu sequence, and L represents a length of the Zadoff-Chu sequence $$x_u(n) = e^{-j\frac{\pi un(n+1)}{L}}, 0 \le n \le L-1.$$

5. The frequency offset estimation apparatus according to claim 4, wherein
the detection unit specifies the sequence number using output of the correlation unit, and detects the position of the side peak according the specified sequence number.

6. A wireless base station having the frequency offset estimation apparatus according to claim 1, comprising
a correction unit configured to correct a frequency of a received signal according to the frequency offset estimated by the frequency offset estimation unit.

7. The wireless base station according to claim 6, further comprising:

a communication scheme decision unit configured to decide a communication scheme according to the frequency offset estimated by the frequency offset estimation apparatus, and a transmission unit configured to transmit a signal to a user terminal using a communication scheme decided by the communication scheme decision unit.

8. The wireless base station according to claim 6, further comprising:

a communication scheme decision unit configured to decide a communication scheme according to the frequency offset estimated by the frequency offset estimation apparatus, and a notification unit configured to perform notification of the communication scheme decided by the communication scheme decision unit to a user terminal.

9. A frequency offset estimation method used in a wireless communication system transmitting a preamble signal generated using a sequence where a position of a side peak in an autocorrelation property of the sequence is not dependent on frequency offset and a correlation value of the side peak changes according to the frequency offset, comprising calculating autocorrelation of a received preamble signal;

detecting a position of a side peak of the autocorrelation of the preamble signal;

calculating a main correlation value representing correlation at a position of a main peak of the autocorrelation and a side correlation value representing correlation at the position of the side peak; and estimating the frequency offset when a sum of the main correlation value and the two side correlation values is larger than a predetermined correlation threshold value, and performing the estimating by estimating the frequency offset within a range of frequency offset by comparing the main correlation value to each of the two side correlation values and, based on the comparing of the main correlation value, further comparing the two side correlation values to each other.

10. The frequency offset estimation method of claim 9, wherein the sequence is Zadoff-Chu sequence and correlation values at positions distant from the position of the main peak by dp and dm are calculated as side peaks, where (u·dp) modulo L=1, dm=L−dp.

* * * * *